Figure 1:
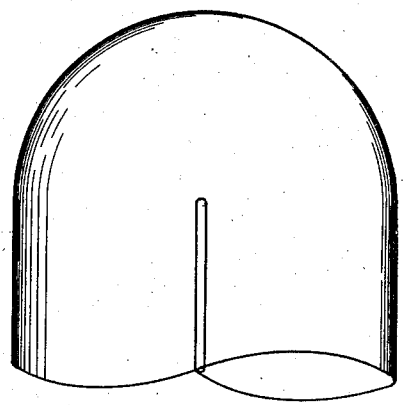
Figure 2:
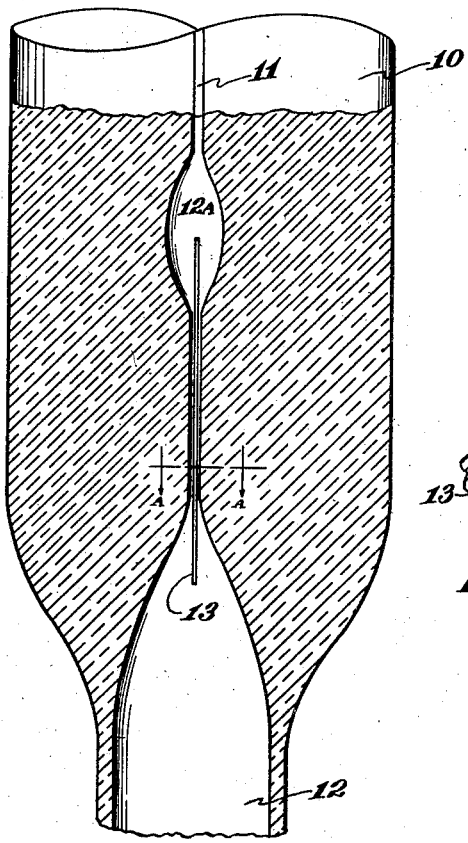
Figure 2:
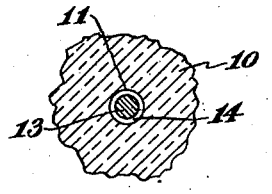

Jan. 7, 1947.  F. E. TANKSLEY  2,414,001
CLINICAL THERMOMETER
Filed Aug. 5, 1944

FORREST E. TANKSLEY
INVENTOR

BY Robert T. Killman
ATTORNEY

Patented Jan. 7, 1947

2,414,001

UNITED STATES PATENT OFFICE 2,414,001

CLINICAL THERMOMETER

Forrest E. Tanksley, Nashville, Tenn., assignor to Eisele & Co., Nashville, Tenn., a partnership Application August 5, 1944, Serial No. 548,232

1 Claim. (Cl. 73—371)

This invention relates to clinical or self-registering thermometers. This type thermometer may be defined as one which, upon being inserted in the oral or rectal cavity or other place the temperature of which it is desired to ascertain the mercury column will rise to the proper point to indicate the temperature upon a suitable scale, usually engraved upon the thermometer stem, but, upon being removed from said cavity, the mercury column will maintain its position in the stem, thus allowing the reading to be made at any time subsequent to such removal, due to the fact that this type of thermometer includes a device which causes the mercury column to separate into two parts at some point between the bulb and the scale, the lower part of the column receding into the bulb as the temperature of the thermometer falls to the ambient temperature, while leaving the upper portion of the mercury column in the highest position it reached during the time the thermometer was inserted in the cavity.

The device by which the mercury column is caused to divide or separate as the temperature of the bulb falls usually is called the contraction and usually consists of a small, partially collapsed bulb formed in the thermometer bore between the main bulb and the scale portion of the stem. The two opposite walls of said contraction bulb are collapsed against each other forming a bifurcated passage of reduced cross section as compared to the bore of the thermometer stem.

The contraction so formed constitutes such an obstruction to the movement of the mercury column that the cohesive force of the mercury is unable to pull the upper portion of the mercury column therethrough, thus causing the column to divide at the contraction.

The proper forming of this contraction requires great skill in manipulation and even under optimum conditions a large percentage of rejects are inevitable.

It is an object of this invention to disclose a new and novel form of contraction which will serve all the useful purposes of the usual form of contraction, but which may be made by relatively unskilled operators and which will eliminate several operations necessary to make the prior form of contraction and which will result in a much smaller percentage of rejects.

The construction of my new form of clinical or self-registering thermometer contraction may best be understood by referring to the accompanying drawing in which:

Figure I is a partial longitudinal section of a preferred form of the thermometer of my invention.

Figure II is a cross section view taken along the line A—A of Figure I.

Referring now in detail to the drawing the numeral 10 denotes the stem of glass containing the axially positioned capillary bore 11. A suitable scale (not shown) is engraved upon the surface of stem 10 and shows, by the height of the top of the mercury column in bore 11, the temperature to which the bulb 12 of the thermometer is or has been subjected.

A small enlargement or bulb 12A is formed in the bore 11 at a point slightly above the main bulb 12. The bulb 12 serves as a container for an expansible liquid, usually mercury. A wire or rod 13 of metal or other suitable material is positioned in bore 11 between the bulbs 12 and 12A, one end of wire 13 extending a short distance into each bulb. The heat of sealing the bulb onto the stem causes the wire 13 to stick or weld slightly to one side of the bore at the lower end, thus retaining it in position.

In practice the diameter of the bore is of the order of .0015 inch and the diameter of the wire is of the order of .001 inch. Thus it will be seen that the portion of the bore into which the wire 13 extends will be restricted generally to an annulus 14 having an external diameter of the order of .0015 inch and an internal diameter of the order of .001 inch. This portion of annular cross section constitutes the contraction which causes the mercury column to divide when the bulb cools off, allowing the upper portion of the column to remain in its indicating position.

The operation of my new improved thermometer is as follows:

Upon being subjected to an elevated temperature the mercury in bulb 12 expands and travels upward and forces through annulus 14 filling bulb 12A past the upper end of rod 13 into bore 11 in which it rises to indicate the temperature to which bulb 12 has been subjected. Upon being removed from the source of heat, the mercury contained in bulb 12 contracts and the column divides in the annulus 14 between bulbs 12 and 12A, the lower part receding into the bulb and the upper part remaining in its indicating position. It will now be seen that the upper portion of the mercury consists of a very fine filament of mercury lying in bore 11 above bulb 12A joined to larger mass of mercury located in bulb 12A. Bulb 12A is made very small as compared to bulb 12 so that temperature variations will not cause appreciable movement of the mercury column due to expansion or contraction of the mercury in bulb 12A. However the diameter of bulb 12A is still large in comparison to the diameter of bore 11.

The cohesive force of the mercury globule in bulb 12A resists any change in the form of the globule and thus this globule of mercury tends to anchor the upper portion of the mercury column in position and resists any movement thereof due to any slight differences in gas pressure on the upper and lower ends of the upper portion of the mercury column. After the reading has been taken the upper portion of the mercury column may be caused to rejoin that in the bulb by shaking it down in the usual manner.

I have observed certain other advantages of my construction. The presence of the metal wire in the bulb and bore causes thermometers made in this way to reach their correct indicating position much quicker than thermometers constructed in the usual manner. This seems to be due to the superior heat conductivity of the wire.

A further advantage observed in my new construction is that it is not subject to clogging by minute impurities in the mercury. Upon heating and cooling there seems to be a relative movement between the wire or rod 13 and the walls of the bore 11 due to differences in the coefficient of expansion of the two which tends to loosen and remove any obstructive matter.

While I have shown bore 11 and wire 13 of circular cross-section, it is understood that the cross section of the bore 11 and/or the wire or rod member 13 may be polyangular, oval, fluted or of any other suitable form.

While the invention has been described in language more or less specific as to structural features, it is to be understood that the invention is not to be limited to the specific features shown, but that means and construction herein disclosed comprise the preferred forms of putting my invention into effect, and the invention is therefore claimed in any of its forms or modifications within the legitimate and valid scope of the appended claim.

A clinical or self-registering thermometer comprising a stem portion having a small bore therethrough, a main bulb for containing a thermoexpansive fluid, a small secondary bulb formed in said bore and slightly above the main bulb, and a wire anchored and retained in the bore between the two bulbs and partially plugging said bore.

FORREST E. TANKSLEY.